(12) United States Patent
Chiu

(10) Patent No.: US 9,188,992 B2
(45) Date of Patent: Nov. 17, 2015

(54) WATER TANK LIMIT SWITCH ASSEMBLY

(71) Applicant: NEW WIDETECH INDUSTRIES CO., LTD., New Taipei (TW)

(72) Inventor: Ming-Tsung Chiu, New Taipei (TW)

(73) Assignee: NEW WIDETECH INDUSTRIES CO., LTD., New Taipei (TW)

( * ) Notice: Subject to any disclaimer, the term of this patent is extended or adjusted under 35 U.S.C. 154(b) by 304 days.

(21) Appl. No.: 14/043,880

(22) Filed: Oct. 2, 2013

(65) Prior Publication Data

US 2015/0090350 A1    Apr. 2, 2015

(51) Int. Cl.
*H01H 35/00* (2006.01)
*G05D 9/04* (2006.01)

(52) U.S. Cl.
CPC .............. *G05D 9/04* (2013.01); *Y10T 137/7358* (2015.04)

(58) Field of Classification Search
CPC ..... G01F 23/00; G01F 23/0007; G01F 23/30; G01F 23/135
USPC ........ 200/61.2; 340/612; 73/290 R, 305, 309, 73/319, 320; 137/386, 395, 398
See application file for complete search history.

(56) References Cited

U.S. PATENT DOCUMENTS

| 2013/0213495 A1* | 8/2013 | Huang | ..................... G01F 23/00 137/386 |
| 2015/0090349 A1* | 4/2015 | Sada | ..................... F24F 11/001 137/386 |

FOREIGN PATENT DOCUMENTS

| CN | 202601505 U | 12/2012 |
| FR | 1496287 A | 9/1967 |
| GB | 1155994 A | 6/1965 |
| GB | 2111183 A | 6/1983 |
| GB | 2461729 A | 1/2010 |
| JP | S58158436 A | 9/1983 |
| WO | 01/93390 A2 | 12/2001 |

OTHER PUBLICATIONS

UK Search Report dated Nov. 21, 2013 issued in corresponding application No. GB1317031.1.

* cited by examiner

*Primary Examiner* — Vanessa Girardi
(74) *Attorney, Agent, or Firm* — Bacon & Thomas, PLLC

(57) ABSTRACT

A water tank has a container, a micro switch, a limiting assembly and a float. The float is mounted slidably in the container. The limiting assembly has an actuating rod that slides in a direction perpendicular to the sliding path of the float. An inclined guiding track is mounted between the float and the actuating rod to convert the moving direction. Since the actuating rod utilizes the movement to switch the micro switch on and off, the actuating rod and the micro switch need no abutting structures. Therefore, when the actuating rod is moved by an accidental force, the actuating rod self-moves back to its original position once the accidental force is removed. Then the micro switch is switched on again so that the household appliance is restarted without any extra acts by a user.

12 Claims, 8 Drawing Sheets

WATER TANK LIMIT SWITCH ASSEMBLY

BACKGROUND OF THE INVENTION

1. Field of the Invention

The present invention relates to a water tank, especially to a water tank for household appliances.

2. Description of the Prior Arts

Some household appliances such as dehumidifiers have water tanks to collect water. When the household appliance is operated, the moist air is drawn into the household appliance. Then the moist air is transformed into water and is collected in the water tank. When the water tank collects a certain amount of water, the household appliance stops operating until the user empties the water tank.

With reference to FIGS. 7 and 8, to stop the household appliance via change of the water level, a conventional water tank comprises a shell 600, a container 60, a float 70 and a micro switch 80. The container 60 is mounted slidably in the shell 600. The float 70 is mounted pivotally in the top of the container 60. The float 70 has an actuating rod 701 extending from one side thereof. The actuating rod 701 protrudes through the container 60. The micro switch 80 is mounted out of the shell 600 and has a pivoting lever 801. The pivoting lever 801 corresponds to the actuating rod 701.

In a normal status, the float 70 is positioned horizontally and the actuating rod 701 presses against the lever 801 such that the micro switch 80 is switched on and the household appliance is operated. Then water is collected continuously in the container 60.

When the collected water in the container 60 is gradually increased, the water lever raises to pivot the float 70 until the actuating rod 701 leaves the lever 801. The lever 801 is pivoted toward the container 60 and the actuating rod 701 abuts between the bottom of the lever 801 and the sidewall of the container 60. Then an open circuit is formed and the household appliance is stopped from operating and the water stops from flowing into the container 60. The user needs to pull the container 60 out of the shell 600 to empty the water inside so that the float 70 is allowed to pivot back to the horizontal status. Then the container 60 is pushed back into the shell 600 so that the actuating rod 701 presses the lever 801 again. The micro switch 80 is then on and the household appliance is restarted.

However, since the actuating rod 701 abuts between the bottom of the lever 801 and the sidewall of the container 60 when the float 70 is pivoted, if the float 70 is accidentally pivoted because the household appliance is placed upside down or is vibrated, the float 70 cannot self-pivot back to the original position. Even if the container 60 has no water inside, the actuating rod 701 may abut against the bottom of the lever 801 and cannot press the lever 801 to actuate the micro switch 80. Therefore, the user needs to pull out and push back the container 60 to restart the household appliance regardless that the container 60 is full or not.

To overcome the shortcomings, the present invention provides a water tank with a limiting assembly to mitigate or obviate the aforementioned problems.

SUMMARY OF THE INVENTION

The main objective of the present invention is to provide a water tank with a limiting assembly. The water tank has a container, a micro switch, a limiting assembly, and a float. The float is mounted slidably in the container. The limiting assembly has an actuating rod that slides in a direction perpendicular to the sliding path of the float. An inclined guiding track is mounted between the float and the actuating rod to convert the moving direction. Since the actuating rod utilizes the actuating rod's movement to switch the micro switch on and off, the actuating rod and the micro switch need no abutting structures. Therefore, when the actuating rod is moved by an accidental force, the actuating rod self-moves back to its original position once the accidental force is removed. Then the micro switch is switched on again so that the household appliance is restarted without any extra acts by a user.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
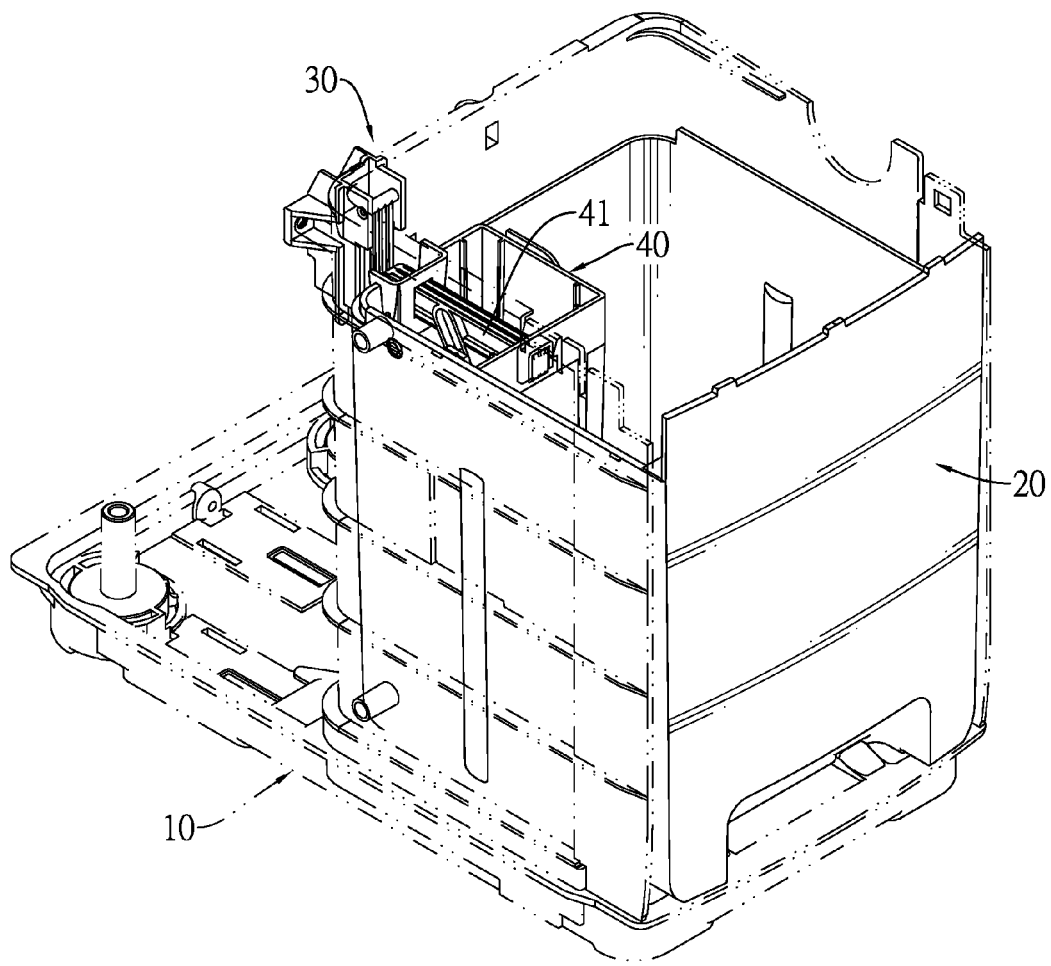
FIG. 1 is a perspective view of a water tank with a limiting assembly in accordance with the present invention.
Figure 2:
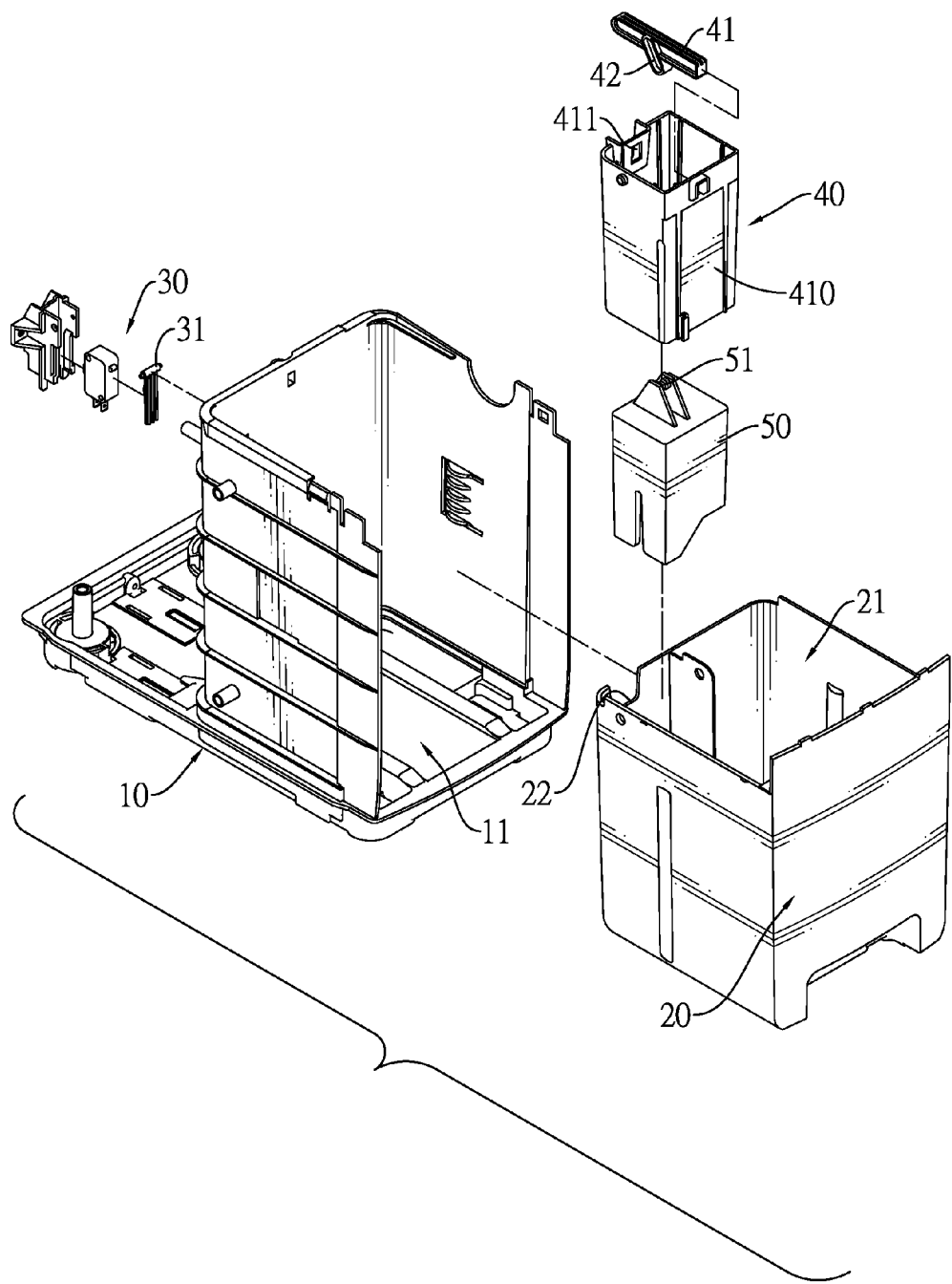
FIG. 2 is a partially exploded perspective view of the water tank in FIG. 1.

With reference to FIGS. 1 and 2, a water tank with a limiting assembly in accordance with the present invention is mounted in a household appliance and comprises a shell 10, a container 20, a micro switch 30, a limiting assembly 40 and a float 50.

Figure 5:
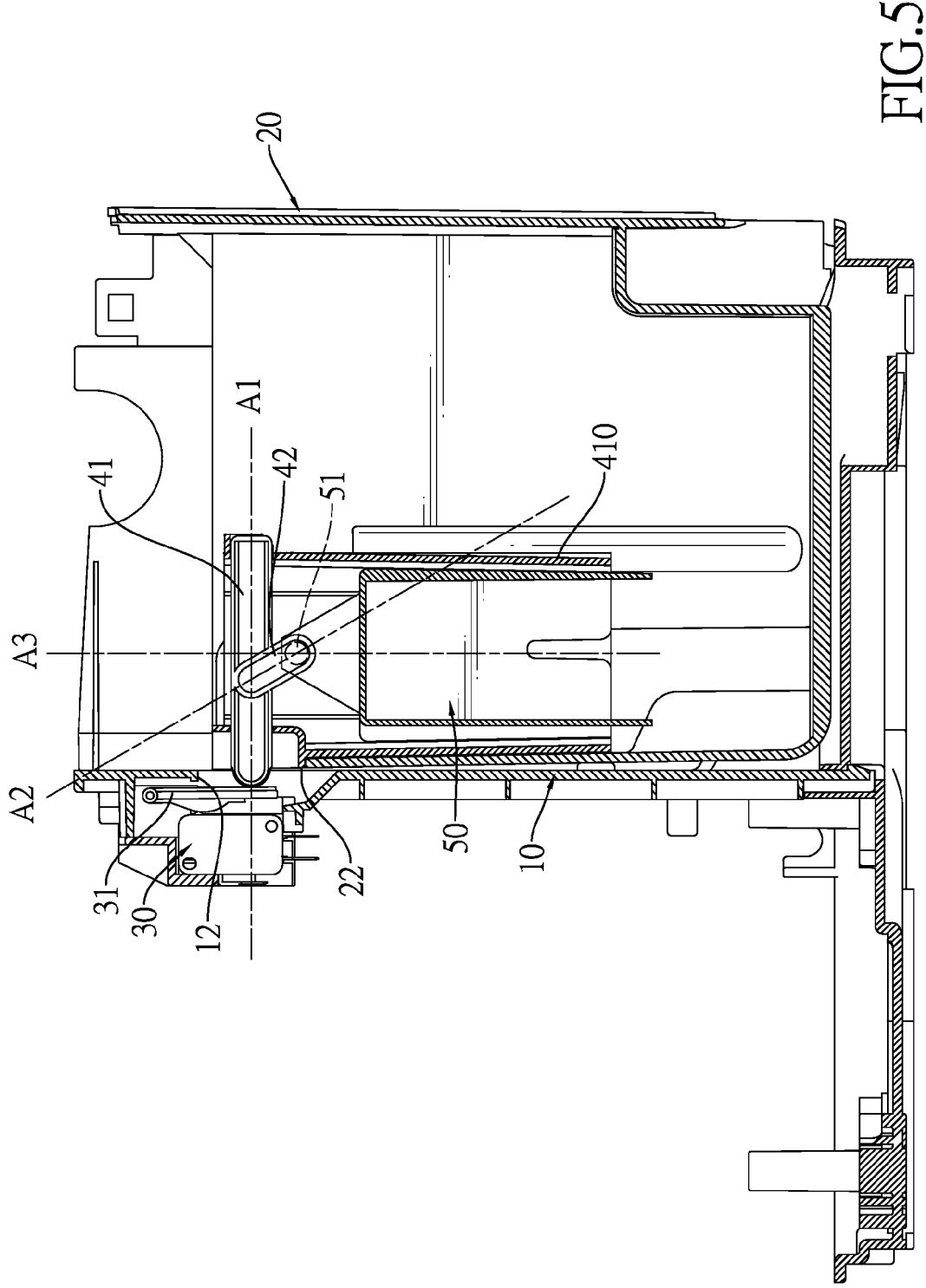
FIG. 5 is an operational side view in partial section of the water tank in FIG. 1, showing a closed circuit.

With reference to FIGS. 1, 2 and 5, the shell 10 is hollow and has an opening 11 formed through a side of the shell and a gap 12 formed through an opposite side of the shell.

Figure 3:
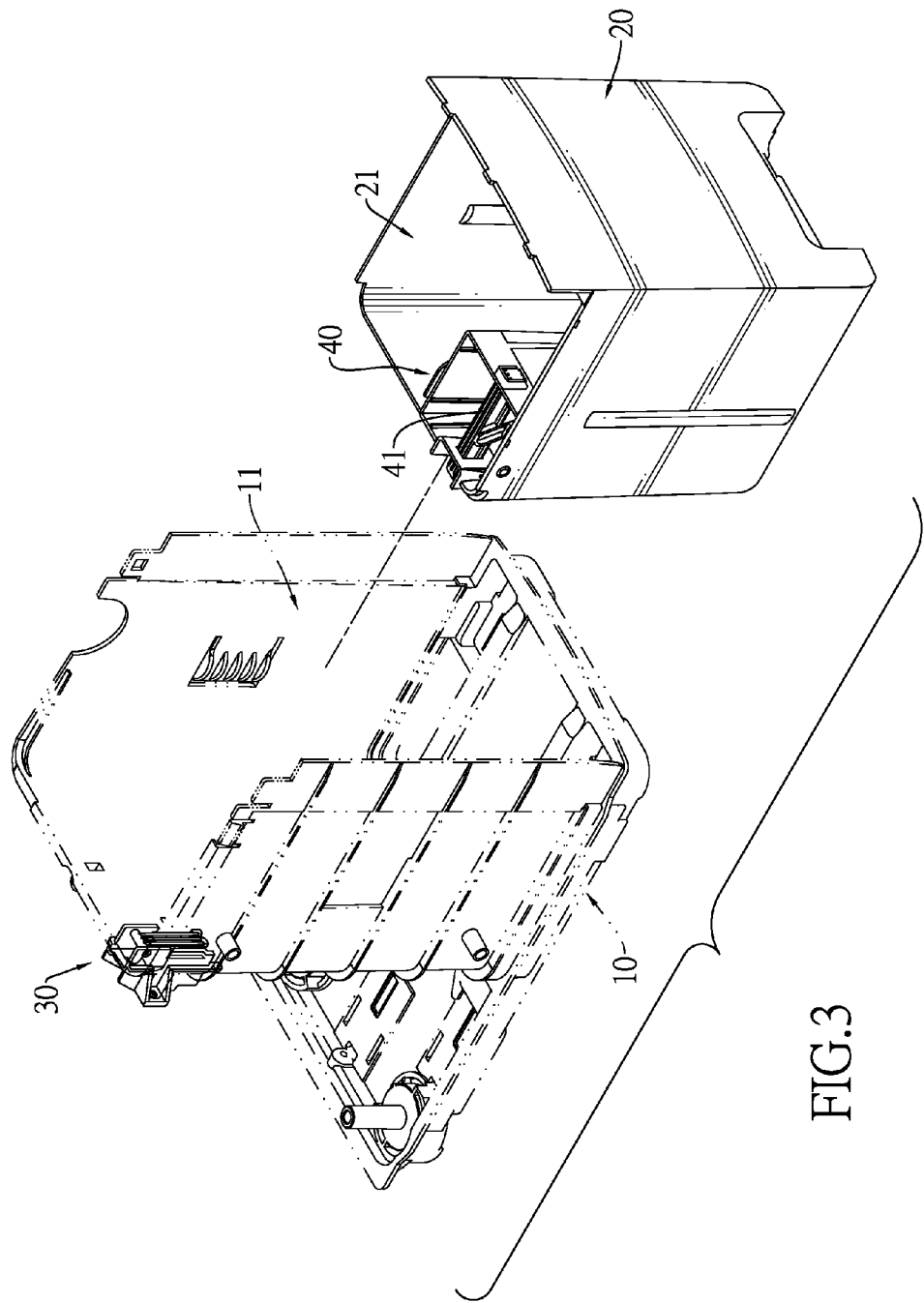
FIG. 3 is another partially exploded perspective view of the water tank in FIG. 1.

With reference to FIGS. 2 and 3, the container 20 is hollow, is mounted slidably in the opening 11 of the shell 10 and has an opening 21 and a gap 22. The opening 21 of the container 20 is formed through a top of the container 20. The gap 22 of the container 20 is formed through a side of the container 20 and communicates with the gap 12 of the shell 10.

The micro switch 30 is mounted on an outside wall of the shell 10 near the gap 12 and has a lever 31. The lever 31 is mounted pivotally on the outside wall of the shell 10 and corresponds to and selectively pivots into the gap 12 of the shell 10.

Figure 4:
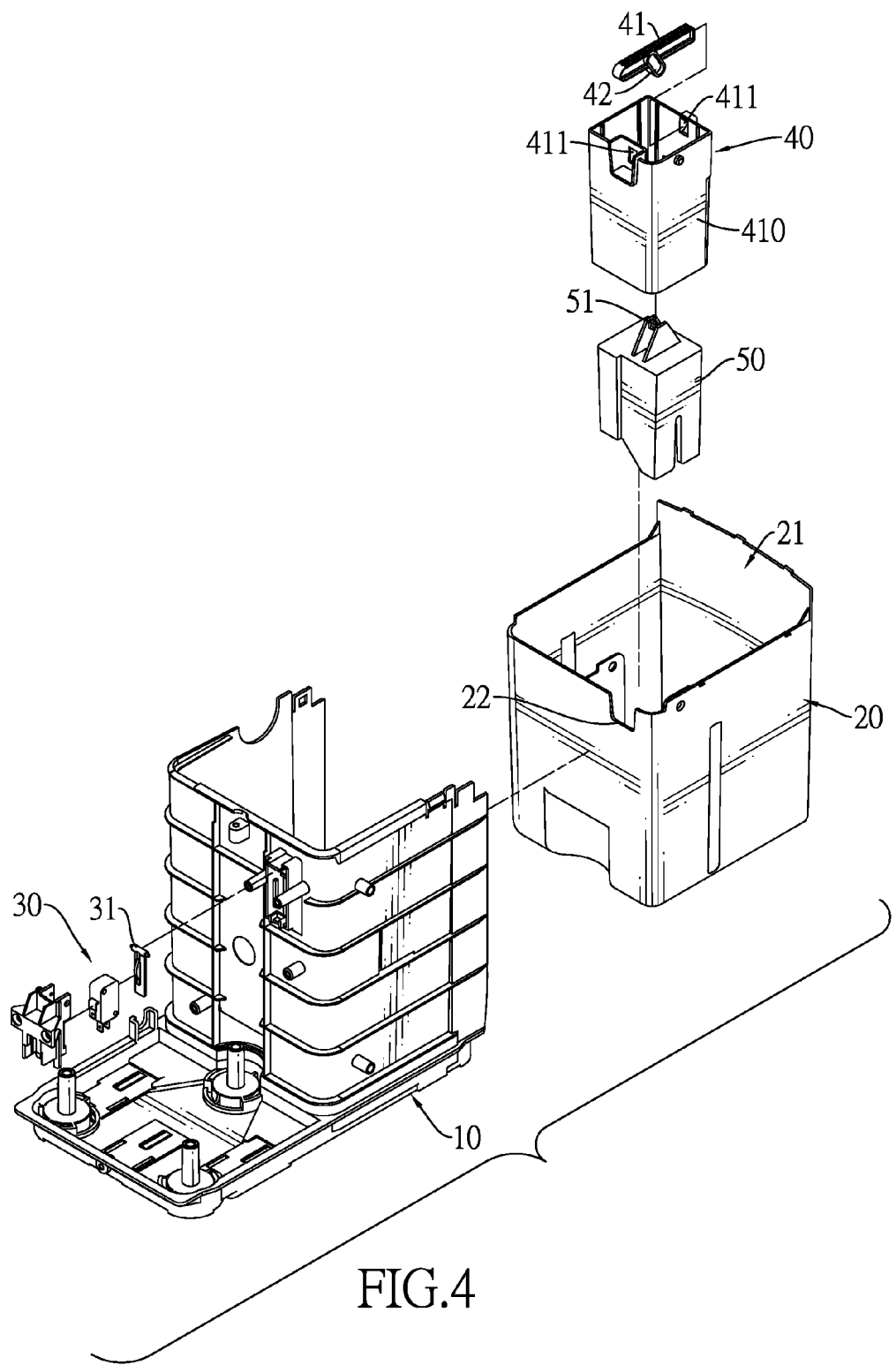
FIG. 4 is still another partially exploded perspective view of the water tank in FIG. 1.

With reference to FIGS. 2, 4 and 5, the limiting assembly 40 is mounted in the container 20 and has an actuating rod 41 and a guiding track 42.

The actuating rod 41 has an outer end and an inner end, is mounted slidably in the container 20 and selectively slides along a first axis A1. The outer end of the actuating rod 41 selectively abuts a side of the lever 31 of the micro switch 30. In a preferred embodiment, the limiting assembly 40 has a hollow casing 410. The casing 410 is mounted securely in the container 20 and has a top opening, a bottom opening, two limiting holes 411 and multiple ribs 412. The limiting holes 411 are formed respectively through two sides of the casing 410 and align with a first axis A1. The ribs 412 are formed separately on an inside wall of the casing 410. The ends of the actuating rod 41 are respectively mounted through the limiting holes 411. The outer end of the actuating rod 41 selectively protrudes through the gap 22 of the container 20 and the gap 12 of the shell 10.

The guiding track 42 has a first end and a second end, is attached securely to the actuating rod 41 and aligns with a second axis A2. The second axis A2 and the first axis A1 are not parallel to each other and intersect to form an angle less than 180 degrees. In a preferred embodiment, the first end of the guiding track 42 is formed on the actuating rod 41, and the guiding track 42 is inclined such that the second end of the guiding track 42 is away from the outer end of the actuating rod 41 with respect to the first end.

The float 50 is mounted slidably in the container 20 and is limited to selectively slide along a third axis A3. The third axis A3 is perpendicular to the first axis A1 such that the third axis A3 and the second axis A2 intersect to form an angle less than 180 degrees. In a preferred embodiment, the float 50 is mounted slidably in the casing 410 and has an outside wall and a protrusion 51. The outside wall of the float 50 abuts the ribs 412 of the casing 410 to limit the float 50 such that the float 50 can only slide along the third axis A3. The protrusion 51 is formed on a top end of the float 50 and mounted slidably in the guiding track 42 of the limiting assembly 40.

With reference to FIG. 5, in a normal status, the float 50 slides to the bottom end of its sliding path along the third axis A3 via gravity. The protrusion 51 abuts the bottom end of the guiding track 42. The actuating rod 41 protrudes through the gap 22 of the container 20 and the gap 12 of the shell 10 and presses against the side of the lever 31. Therefore, the micro switch 30 is switched on and the household appliance is operated.

Figure 6:
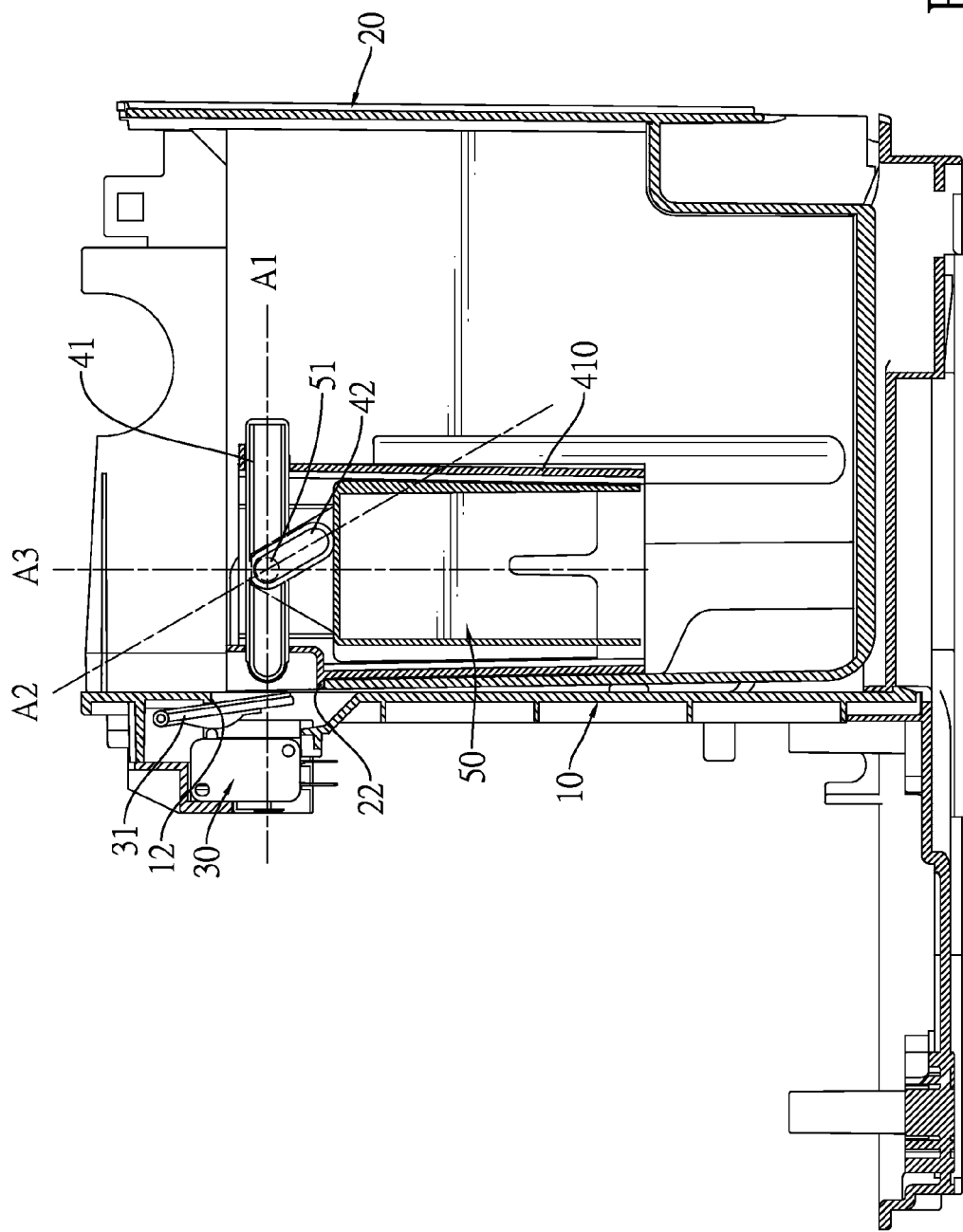
FIG. 6 is an operational side view in partial section of the water tank in FIG. 1, showing an open circuit.
Figure 7:
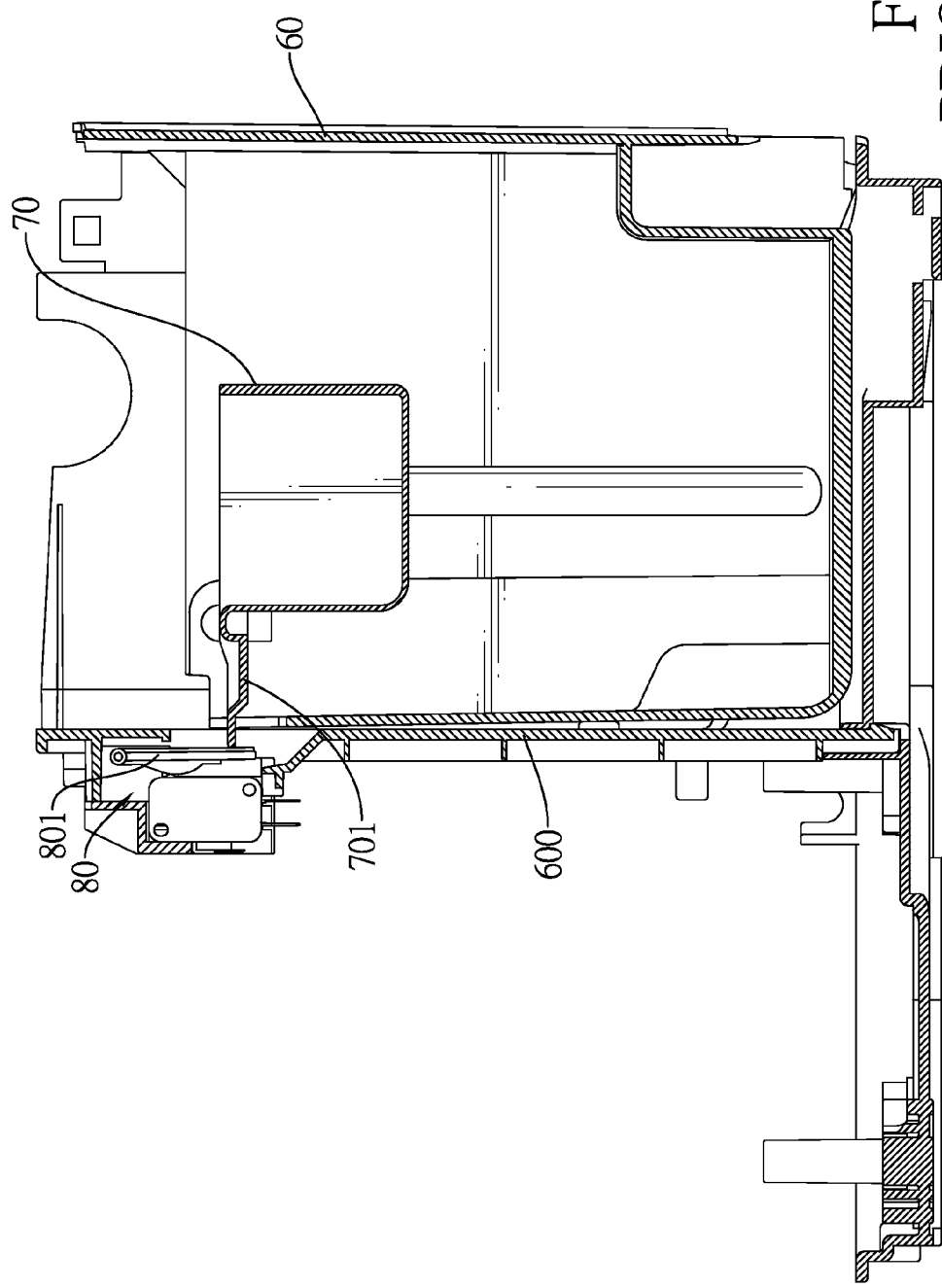
FIG. 7 is an operational side view in partial section of a conventional water tank in accordance with the prior art, showing a closed circuit.
Figure 8:
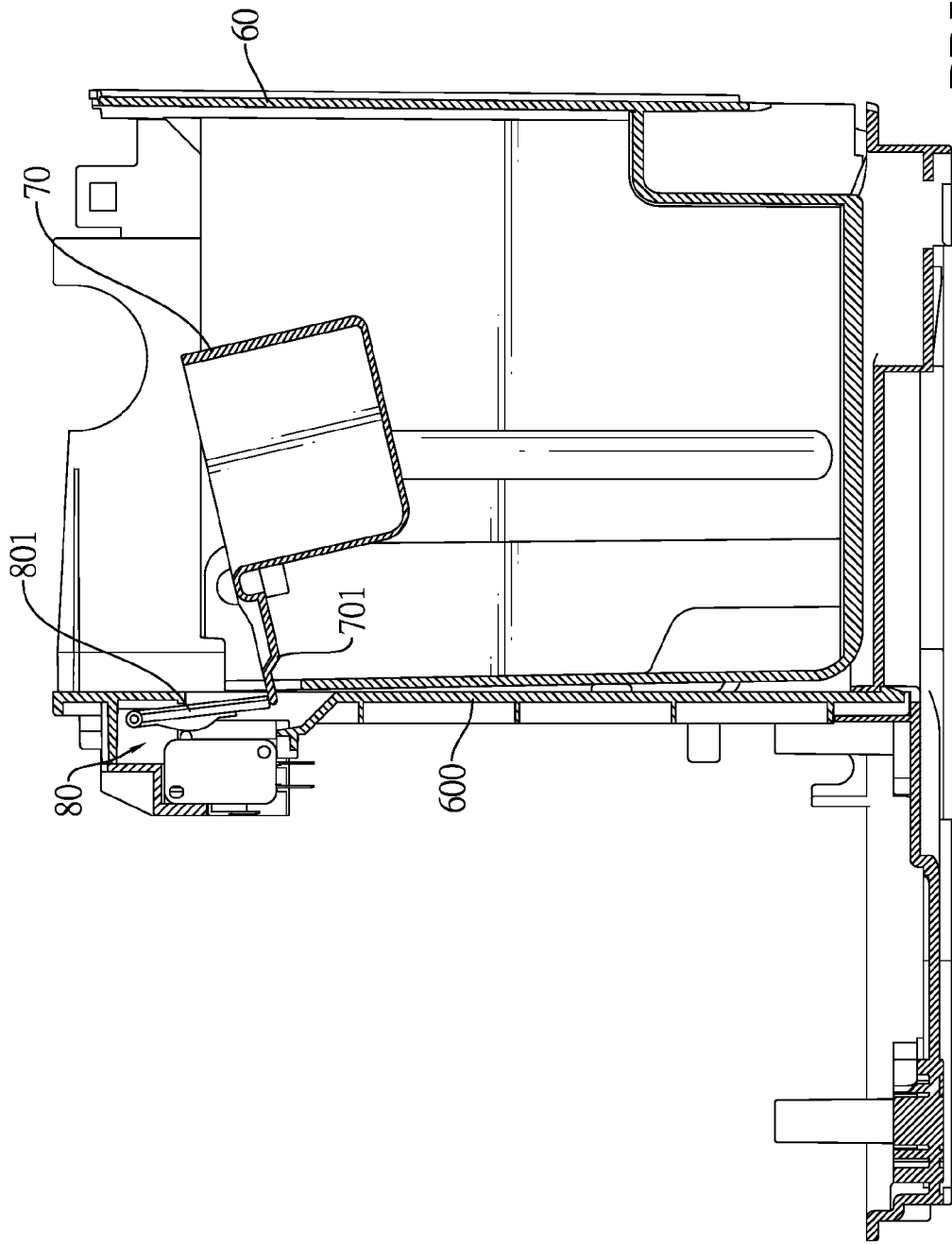
FIG. 8 is an operational side view in partial section of the conventional water tank in FIG. 7, showing an open circuit.

With reference to FIG. 6, when the collected water in the container 20 reaches a threshold water level to push the float 50 to move upward, the protrusion 51 slides in the guiding track 42 along the third axis A3. Since the float 50 is limited to slide along the third axis A3, the guiding track 42 is forced to move along the second axis A2 to allow the float 50 to slide along the third axis A3. Moreover, because the guiding track 42 is attached securely to the actuating rod 41, the actuating rod 41 is forced to slide along the first axis A1 when the guiding track 42 slides along the third axis A3. Then the actuating rod 41 gradually leaves the side of the lever 31 to switch off the micro switch 30 and the household appliance is stopped from operating.

With the guiding track 42, the upright movement of the float 50 is converted into the lateral movement of the actuating rod 41 such that the actuating rod 41 leaves the lever 31 when the micro switch 30 is switched off. Therefore, if the household appliance is accidentally moved or positioned upside down to move the float 50 such that the actuating rod 41 is forced to leave the lever 31, the lever 31 is not restricted by other elements and is free to be pivoted. Once the household appliance is reinstated to the original position, the float 50 moves back by gravity such that the household appliance is restarted without any extra acts by the user.

Thus, only when the collected water in the container 20 reaches a threshold water level, the float 50 is kept at the top end of its sliding path. Any accidental movement can only move the float 50 temporally. When the external force is eliminated, the float 50 is reinstated to its original position without any extra acts by the user.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A water tank comprising:
a hollow shell;
a hollow container mounted slidably in the shell;
a micro switch mounted on an outside wall of the shell and having a lever mounted pivotally on the outside wall of the shell;
a limiting assembly mounted in the container and having
an actuating rod mounted slidably in the container, selectively sliding along a first axis and having
an outer end selectively abutting a side of the lever of the micro switch; and
an inner end; and
a guiding track attached securely to the actuating rod and aligning with a second axis; and
a float mounted slidably in the container, limited to selectively slide along a third axis and having a protrusion formed on a top end of the float and mounted slidably in the guiding track of the limiting assembly,
wherein the second axis and the first axis intersect to form an angle less than 180 degrees, and the third axis is perpendicular to the first axis.

2. The water tank as claimed in claim 1, wherein
the shell has a gap formed through a side of the shell;
the container has a gap formed through a side of the container and communicating with the gap of the shell; and
the outer end of the actuating rod selectively protrudes through the gap of the container and the gap of the shell.

3. The water tank as claimed in claim 1, wherein
the limiting assembly has a hollow casing mounted securely in the container and having a top opening, a bottom opening, two limiting holes formed respectively through two sides of the casing and aligning with the first axis;
the ends of the actuating rod are respectively mounted through the limiting holes of the casing; and
the float is mounted slidably in the casing.

4. The water tank as claimed in claim 3, wherein
the shell has a gap formed through a side of the shell;
the container has a gap formed through a side of the container and communicating with the gap of the shell; and
the outer end of the actuating rod selectively protrudes through the gap of the container and the gap of the shell.

5. The water tank as claimed in claim 3, wherein
the casing has multiple ribs formed separately on an inside wall of the casing; and
the float has an outside wall abutting the ribs of the casing.

6. The water tank as claimed in claim 5, wherein
the shell has a gap formed through a side of the shell;
the container has a gap formed through a side of the container and communicating with the gap of the shell; and
the outer end of the actuating rod selectively protrudes through the gap of the container and the gap of the shell.

7. The water tank as claimed in claim 1, wherein the guiding track has a first end and a second end, the first end of the guiding track is formed on the actuating rod, and the guiding track is inclined such that the second end of the guiding track is away from the outer end of the actuating rod with respect to the first end.

8. The water tank as claimed in claim 7, wherein
the shell has a gap formed through a side of the shell;
the container has a gap formed through a side of the container and communicating with the gap of the shell; and
the outer end of the actuating rod selectively protrudes through the gap of the container and the gap of the shell.

9. The water tank as claimed in claim 7, wherein the limiting assembly has a hollow casing mounted securely in the container and having a top opening, a bottom opening, two limiting holes formed respectively through two sides of the casing and aligning with the first axis;
the ends of the actuating rod are respectively mounted through the limiting holes of the casing; and
the float is mounted slidably in the casing.

10. The water tank as claimed in claim 9, wherein
the shell has a gap formed through a side of the shell;
the container has a gap formed through a side of the container and communicating with the gap of the shell; and
the outer end of the actuating rod selectively protrudes through the gap of the container and the gap of the shell.

11. The water tank as claimed in claim 9, wherein
the casing has multiple ribs formed separately on an inside wall of the casing; and
the float has an outside wall abutting the ribs of the casing.

12. The water tank as claimed in claim 11, wherein
the shell has a gap formed through a side of the shell;
the container has a gap formed through a side of the container and communicating with the gap of the shell; and
the outer end of the actuating rod selectively protrudes through the gap of the container and the gap of the shell.

* * * * *